United States Patent
Wagner

(10) Patent No.: US 10,486,007 B2
(45) Date of Patent: Nov. 26, 2019

(54) OXYGEN REDUCTION SYSTEM AND METHOD FOR OPERATING AN OXYGEN REDUCTION SYSTEM

(71) Applicant: AMRONA AG, Zug (CH)

(72) Inventor: Torsten Wagner, Wietze/Hornbostel (DE)

(73) Assignee: AMRONA AG, Zug (CH)

( * ) Notice: Subject to any disclaimer, the term of this patent is extended or adjusted under 35 U.S.C. 154(b) by 431 days.

(21) Appl. No.: 15/033,806

(22) PCT Filed: Sep. 3, 2014

(86) PCT No.: PCT/EP2014/068704
§ 371 (c)(1),
(2) Date: May 2, 2016

(87) PCT Pub. No.: WO2015/082088
PCT Pub. Date: Jun. 11, 2015

(65) Prior Publication Data
US 2016/0263413 A1   Sep. 15, 2016

(30) Foreign Application Priority Data
Dec. 4, 2013   (EP) .................................... 13195659

(51) Int. Cl.
*A62C 99/00* (2010.01)
*G01M 3/28* (2006.01)
*A62C 3/00* (2006.01)

(52) U.S. Cl.
CPC .......... *A62C 99/0018* (2013.01); *A62C 3/002* (2013.01); *G01M 3/2815* (2013.01); *A63B 2213/006* (2013.01)

(58) Field of Classification Search
CPC .................................................. G01M 3/2815
See application file for complete search history.

(56) References Cited

U.S. PATENT DOCUMENTS

| 5,971,080 A | 12/1999 | Loh et al. | |
|---|---|---|---|
| 2003/0214413 A1* | 11/2003 | Patterson | F17D 5/02 |
| | | | 340/626 |
| 2008/0092633 A1* | 4/2008 | Wagner | G01M 3/226 |
| | | | 73/40.7 |

FOREIGN PATENT DOCUMENTS

| DE | 198 11 851 A1 | 9/1999 |
|---|---|---|
| DE | 10 2010 050505 A1 | 5/2012 |
| RU | 2212262 C2 | 9/2003 |
| WO | WO 2008/046675 A1 | 4/2008 |

* cited by examiner

*Primary Examiner* — Paul M. West
*Assistant Examiner* — Mark A Shabman
(74) *Attorney, Agent, or Firm* — Cesari and McKenna, LLP

(57) ABSTRACT

The invention relates to a oxygen reduction system as well as a method for operating an oxygen reduction system. The oxygen reduction system comprises an inert gas source and a line system which is fluidly connected or connectable to the inert gas source and to the at least one enclosed area in order to supply the gas provided by the inert gas source to the at least one enclosed area as needed. The invention provides for conducting a leak test on at least one section of the line system by pressure-testing the line section to be checked for tightness using at least a portion of the gas mixture or gas provided by the inert gas source.

18 Claims, 2 Drawing Sheets

OXYGEN REDUCTION SYSTEM AND METHOD FOR OPERATING AN OXYGEN REDUCTION SYSTEM

CROSS REFERENCE TO RELATED APPLICATIONS

Figure 1:
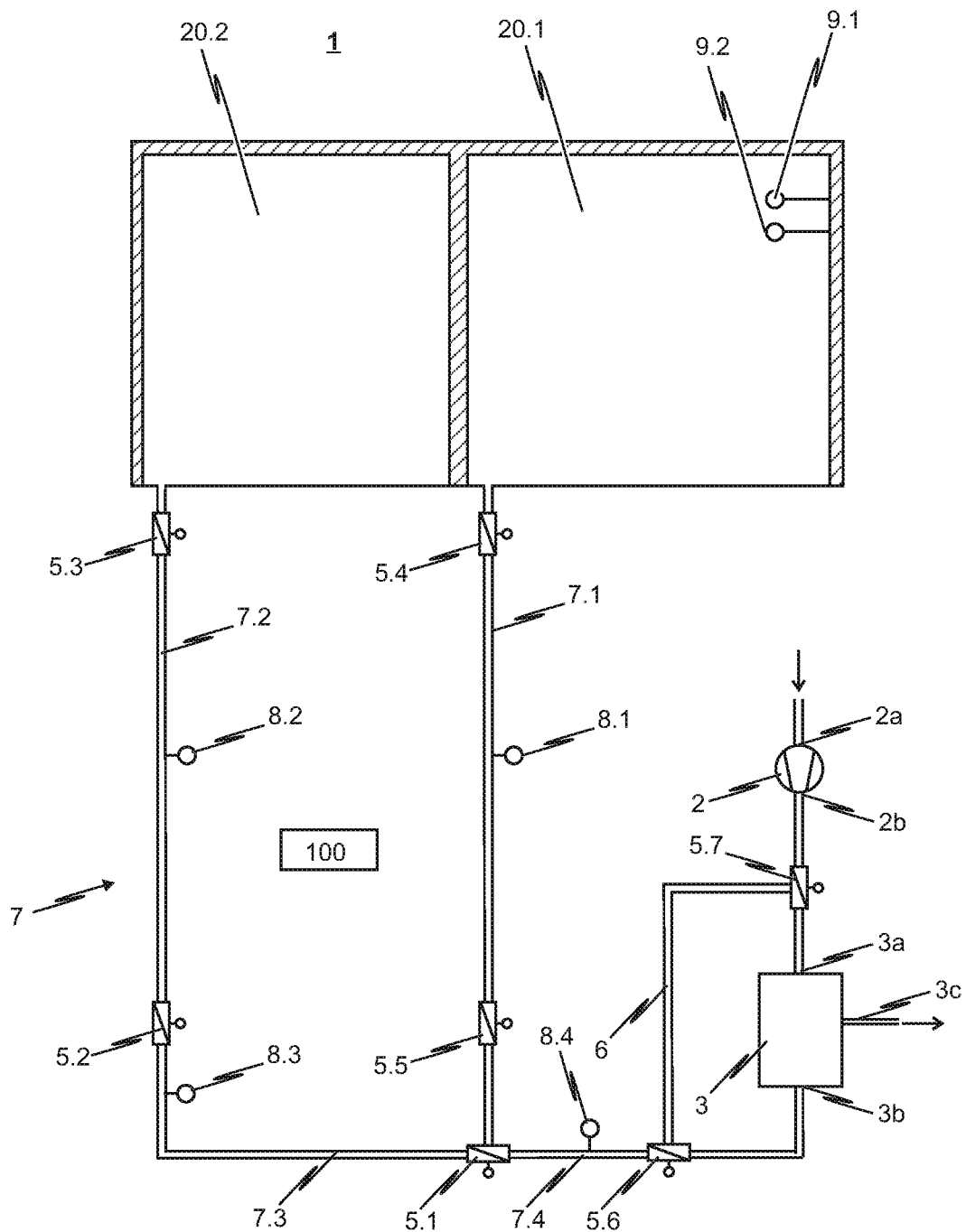

This application is the National Stage of International Application No. PCT/EP2014/068704, filed on Sep. 3, 2014, which claims the benefit of European Application No. 13195659.1, filed on Dec. 4, 2013. The contents of both applications are hereby incorporated by reference in their entirety.

The present invention relates to a method for operating an oxygen reduction system in accordance with the preamble of independent claim 1.

Accordingly, the invention relates in particular to a method for operating an oxygen reduction system comprising a source of inert gas for providing an oxygen-reduced gas mixture, or inert gas respectively, and a line system. The line system of the oxygen reduction system is fluidly connected or connectable to the inert gas source and to at least one enclosed area in order to supply at least a portion of the gas mixture or gas provided by the inert gas source to the at least one enclosed area as needed. It is thereby provided for at least a portion of the gas mixture or gas provided by the inert gas source to be fed through the line system to the at least one enclosed area during the normal operation of the oxygen reduction system such that the oxygen content in the atmosphere of the enclosed area assumes a predefined or definable value which is reduced compared to the oxygen content of the normal ambient air.

The invention further relates to an oxygen reduction system for the regulated reducing of the oxygen content in the atmosphere of an enclosed area, wherein the oxygen reduction system comprises an inert gas source for providing an oxygen-reduced gas mixture, or inert gas respectively, and a line system which is fluidly connected or connectable to the inert gas source and to the enclosed area in order to supply at least a portion of the gas mixture or gas provided by the inert gas source to the enclosed area as needed.

The method according to the invention, or the inventive system respectively, serves for example in minimizing risk and in extinguishing fires in a protected room subject to monitoring, whereby the enclosed room is continuously rendered inert to different drawdown levels for the purpose of preventing or controlling fire.

A further application example for the inventive inerting method is providing hypoxic training conditions in an enclosed room in which the oxygen content has been reduced. Such a room enables training under artificially simulated high-altitude conditions, also referred to as "normobaric hypoxic training." Another example of use is the storing of items, particularly food, preferentially pomaceous fruit, in a so-called "controlled atmosphere (CA)" in which the proportional percentage of atmospheric oxygen is regulated in order to, among other things, slow the aging process acting on the perishable merchandise.

The basic principle behind inerting technology to prevent fires is based on the knowledge that in enclosed rooms which are only entered occasionally by humans or animals, and in which the equipment housed therein reacts sensitively to the effects of water, the risk of fire can be countered by reducing the oxygen concentration in the relevant area to a value of e.g. approximately 15% by volume. At such a (reduced) oxygen concentration, most combustible materials can no longer ignite. Accordingly, the main areas of application for inerting technology in preventing fires also include IT areas, electrical switching and distribution rooms, enclosed facilities as well as storage areas containing high-value commercial goods.

The preventative effect resulting from this method is based on the principle of oxygen displacement. As is known, normal ambient air consists of 21% oxygen by volume, 78% nitrogen by volume and 1% by volume of other gases. For fire prevention purposes, the oxygen content of the spatial atmosphere within the enclosed room is decreased by introducing an oxygen-displacing gas, for example nitrogen. A preventative effect is known to begin as soon as the percentage of oxygen drops below about 15% by volume. Depending upon the flammable substances stored in the protected room, it may be necessary to further lower the percentage of oxygen to, for example, 12% by volume.

The principle of an oxygen reduction system of the type cited at the outset is known from the prior art. For example, the published DE 198 11 851 A1 document describes an inerting system designed to lower the oxygen content in an enclosed room to a specific base inerting level and, in the event of a fire, to rapidly lower the oxygen content further to a specific full inerting level.

The term "base inerting level" as used herein is to be understood as referring to a reduced oxygen content compared to the oxygen content of the normal ambient air, however whereby this reduced oxygen content poses no danger of any kind to persons or animals such that they can still enter into the area continuously rendered inert—at least briefly—without any problem; i.e. without any special protective measures such as e.g. oxygen masks. The base inerting level corresponds to an oxygen content within the protected area of for example 15% to 17% by volume, On the other hand, the term "full inerting level" is to be understood as an oxygen content which has been further reduced compared to the oxygen content of the base inerting level such that the flammability of most materials has already been decreased to a level at which they are no longer able to ignite. Depending upon the fire load within the respective area, the full inerting level generally ranges from 12% to 14% oxygen concentration by volume.

In order to equip an enclosed area with an oxygen reduction system, an appropriate source of inert gas is first to be provided so as to be able to supply an oxygen-reduced gas mixture or an inert gas to be introduced into the enclosed room. The dispensing capacity of the inert gas source; i.e. the amount of inert gas the inert gas source is able to provide per unit of time, should thereby be designed for the properties of the enclosed area, particularly the spatial volume and/or the airtightness of the enclosed area. If the oxygen reduction system is used as a (preventive) fire control measure, it is particularly to be ensured that, in the event of a fire, a sufficient amount of inert gas can be introduced into the spatial atmosphere of the enclosed area within a very short period of time so that an extinguishing effect occurs as quickly as possible.

Although the oxygen-reduced gas mixture respectively inert gas to be introduced into the enclosed area as needed can in principle be stored in a bank of high-pressure cylinders, it has become standard practice to produce at least a portion of the oxygen-reduced gas mixture to be supplied by the inert gas source in situ, particularly because the storage of inert gas in gas cylinder banks requires special structural measures.

In order to be able to produce at least some of the oxygen-reduced gas mixture and/or inert gas to be supplied in situ, the inert gas source usually comprises a compressor system as well as a gas separation system connected to the compressor system's discharge-side outlet. The compressor system compresses an initial gas mixture and at least a portion of the oxygen contained within the compressed initial gas mixture is separated out in the gas separation system fluidly connected to the compressor system so that an oxygen-reduced gas mixture is provided at the outlet of the gas separation system.

As used herein, the term "initial gas mixture" refers in general to a mixture of gas which, in addition to containing oxygen, particularly also comprises nitrogen and further gases as applicable such as e.g. noble gases. Normal ambient air is for example feasible as an initial gas mixture; i.e. a mixture of gas consisting of 21% oxygen by volume, 78% nitrogen by volume and 1% by volume of other gases. It is however also conceivable to use a portion of the enclosed area's air as the initial gas mixture, whereby fresh air is then preferably added to this portion of air from the enclosed area.

Realizing the technical configuration of an enclosed area equipped with an oxygen reduction system in particular requires the provision of a line system via which the oxygen-reduced gas mixture or inert gas supplied by the inert gas source can be fed to the enclosed area when needed. It is hereby not uncommon for the line system to not only fluidly connect just one individual area to the inert gas source; the line system in fact frequently connects a plurality of areas to the oxygen reduction system's inert gas source so as to be able to render multiple areas inert when needed, for example within a building having only one oxygen reduction system. The line system is inasmuch particularly realized to some extent as a gas pipeline system of rather complex design.

The present invention is based on the task of specifying an oxygen reduction system, respectively a method for operating an oxygen reduction system, able to ensure compliance with the technical configuration standards without separate verification. In the present context, standards in particular refer to compliance with the respective safety regulations and—when the oxygen reduction system is used for the purpose of preventive fire protection—the assurance of a sufficient extinguishing agent supply in case of fire.

With respect to the method, the task on which the invention is based is solved by the subject matter of independent claim 1 and with respect to the oxygen reduction system, by the subject matter of independent claim 14. Advantageous further developments of the inventive operating method are indicated in dependent claims 2 to 13 and of the inventive oxygen reduction system in dependent claim 15.

To solve the task on which the invention is based and to ensure that the oxygen reduction system is in compliance with the respectively applicable technical configuration standards without performing separate verification thereof, it is inventively provided to enlist the technical components of the oxygen reduction system in conducting preferably regular leakage testing on at least one section of the line system. The leak test uses at least a portion of the gas mixture or gas provided by the inert gas source of the oxygen reduction system to pressure-test the line section to be checked for tightness.

The leak test is preferably conducted at predefinable times and/or upon predefinable events, whereby it can particularly occur automatically and/or selectively automatically. In conjunction hereto, it is for example conceivable for the leak test to be conducted when the oxygen content in the atmosphere of the at least one enclosed area has been reduced to the predefined or definable value by the regulated feed of at least a portion of the gas mixture or gas provided by the inert gas source, whereby none of the gas mixture or gas provided by the inert gas source is fed into the at least one enclosed area through the line system while the leak test is being conducted.

Pressure-testing the line section to be checked for tightness of the line system part of the oxygen reduction system is conducted according to the inventive solution by means of a gas, or a gas mixture respectively, provided by the inert gas source part of the oxygen reduction system. In one preferential realization of the inventive solution, it is in this context provided for the inert gas source to comprise a compressor system and a gas separation system situated downstream thereof in terms of the flow, wherein an initial gas mixture compressed by the compressor system is at least intermittently introduced into an inlet of the gas separation system, and wherein the compressed initial gas mixture is at least partly separated into different gas components in the gas separation system such that an oxygen-reduced and nitrogen-enriched gas mixture is provided at an outlet of the gas separation system. To conduct the leak test, either the compressed initial gas mixture provided by the compressor system or the nitrogen-enriched gas mixture provided at the outlet of the gas separation system can then be used and introduced into the section of the line system to be checked.

The solution according to the invention is not only suitable for assessing the tightness of the entire line system of the oxygen reduction system as a whole; localization of any leakage there may be in the line system is in fact also con-ceivable. All that is required hereto is for the line system to be divided into multiple directly adjacent sections able to be separated from one another by controllable valves. This measure enables the directly adjacent and valve-separable sections of the line system to be individually tested for tightness one after the other.

With respect to conducting the line section leak test in the line system part of the oxygen reduction system, one aspect of the present invention provides for initially cutting off a flow of the gas mixture or gas provided by the inert gas source through the line system of the oxygen reduction system such that the section of the line system to be tested for tightness still remains fluidly connected to the inert gas source but is no longer connected to the at least one enclosed area. The line section to be tested for tightness is thereafter filled with at least a portion of the gas mixture or gas provided by the inert gas source such that excess pressure builds up in the line section to be tested. It can then be determined whether the excess pressure which developed in the line section under testing drops below a critical threshold value within a predefined or definable time period.

To block a flow of the gas mixture or gas respectively provided by the inert gas source through the line system such that the section of the line system to be tested for tightness remains fluidly connected to the inert gas source but not to the at least one enclosed area, an appropriate approach would be the closing of a respective valve in the flow path, particularly a zone valve in the line system.

To increase the precision of the leak test, a further development of the inventive method provides for there being a time lag between the method step of filling the line section under testing with the gas mixture or gas provided by the inert gas source and the method step of detecting the development of the excess pressure in the line section under testing over time in order to enable the gas mixture/gas introduced into the section of the line system being tested to settle.

The precision of the leak test is then in particular also increased by quantifying a chronological pressure curve and detecting any decrease in pressure indicative of leakage by accordingly analyzing the chronological pressure curve. An absolute pressure or differential pressure measuring system lends itself particularly well to the chronological pressure curve measurement.

When the presence of a leak in the section of the line system under testing is detected by way of the inventive method, a corresponding malfunction notification and/or alarm signal is/are preferably emitted. This particularly occurs upon determining that the pressure which built up in the section of the tested line system has dropped below a critical threshold value within a predefined or definable time period.

The following will reference the accompanying drawings in describing embodiments of the inventive solution.

Figure 2:
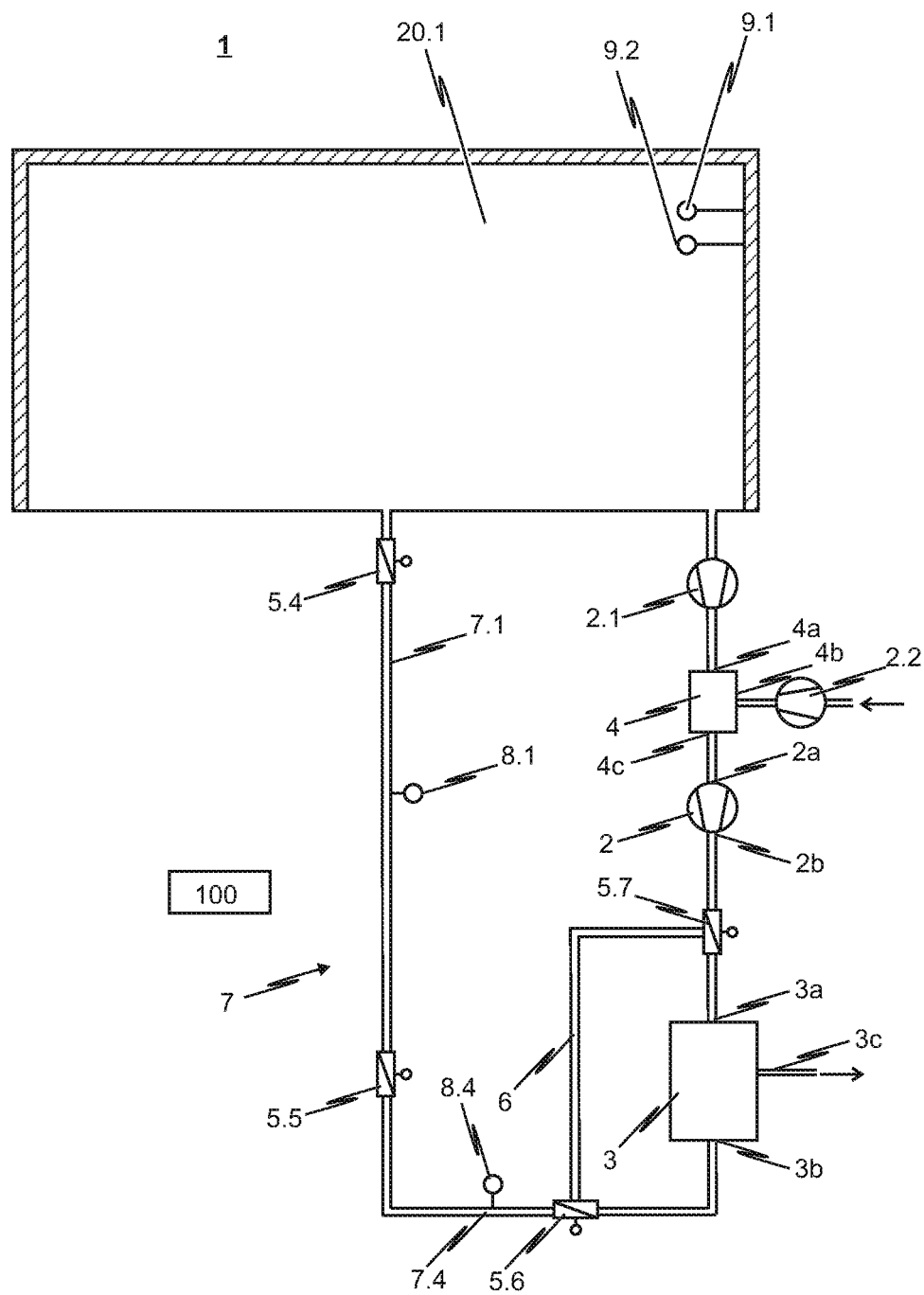

Shown are:

FIG. 1: a schematic view of an example embodiment of the oxygen reduction system according to the invention; and FIG. 2: a schematic view of a further example embodiment of the oxygen reduction system according to the invention.

FIG. 1 shows a schematic depiction of an example embodiment of the inventive oxygen reduction system 1 which, in this embodiment, serves to set and maintain a predefinable drawdown level (inerting level) in the spatial atmosphere of at least one enclosed area.

In detail, the oxygen reduction system 1 depicted schematically in FIG. 1 serves as a so-called dual-zone system with which a predefinable drawdown level can be respectively set and maintained in a total of two enclosed areas 20.1, 20.2. The drawdown level in the two enclosed areas 20.1, 20.2 can be defined and correspondingly set independently of one another.

It is to be noted at this point that the inventive oxygen reduction system 1 can of course also be designated for only one individual enclosed area or for more than two enclosed areas. Hence, FIG. 2 shows an example embodiment of an oxygen reduction system 1 designed as a single-zone system with which a predefinable drawdown level is set and maintained in only one individual enclosed area 20.1.

Regardless of whether the oxygen reduction system is configured as a single, dual or multi-zone system, an enclosed area 20.1, 20.2 assigned to the oxygen reduction system 1 can for example in particular be a stockroom in which the oxygen content in the air of the room can be lowered to and maintained at a specific (base) inerting level of e.g. 15% oxygen content by volume, particularly as a preventive fire control measure. However, a different (further reduced) oxygen content is of course also conceivable for the spatial atmosphere of the enclosed area 20.1, 20.2 associated with the oxygen reduction system 1.

The oxygen reduction system 1 in the embodiment depicted as an example in FIG. 1 comprises a compressor system 2 with which fresh air is sucked in through its inlet 2a as the initial gas mixture during operation.

The compressor system 2 comprises an outlet 2b which is fluidly connected or connectable to an inlet 3a of a gas separation system 3. The fresh air can in this way be supplied to the gas separation system 3 as an initial gas mixture compressed by the compressor system 2.

As indicated in FIG. 2, however, it is also conceivable for a recirculation to be provided in one modification of the embodiment depicted in FIG. 1 such that fresh air alone is not used for the initial gas mixture but rather a mixture of fresh air and air from the enclosed area. In detail, the inlet 2a of the compressor system 2 is hereby fluidly connected or connectable to an outlet 4c of a mixing chamber 4 in the embodiment schematically depicted in FIG. 2. The mixing chamber 4 has two inlets 4a, 4b. A first inlet 4a of the mixing chamber 4 is fluidly connected or connectable to the spatial atmosphere of the (in FIG. 2 single) enclosed area 20.1 by way of a compressor or blower 2.1 respectively.

Extrapolated to the embodiment depicted in FIG. 1 which shows—in contrast to the single-zone system depicted in FIG. 2—a dual/multi-zone system, it is thus in principle conceivable, also in the embodiment depicted in FIG. 1, for a mixing chamber 4 to be provided, whereby the inlet 4a of the mixing chamber 4 can be fluidly connected to the spatial atmosphere of the first and/or second enclosed area 20.1, 20.2. Air from within the first enclosed area 20.1 and/or second enclosed area 20.2 can then be supplied in regulated manner to the mixing chamber 4 via the inlet 4a and the compressor or blower 2.1.

As FIG. 2 shows, the further inlet 4b of the mixing chamber 4 serves to feed fresh air as needed to the mixing chamber 4. For this purpose, a compressor or blower system 2.2 is allocated to the mixing chamber 4 for drawing in fresh air (external air) and supplying it to the mixing chamber 4 via inlet 4b.

The initial gas mixture to be supplied to the compressor system 2 is provided within the mixing chamber 4. The initial gas mixture can be either pure fresh air—as in the embodiment according to FIG. 1—or also a mixture of fresh air and some of the room air extracted from the first and/or second enclosed area 20.1, 20.2.

To be noted at this point is that the mixing chamber 4 is not essential to the present invention and one realization of the invention can of course also dispense with said mixing chamber 4. As is disclosed in conjunction with the oxygen reduction system 1 schematically depicted in FIG. 1, it is in particular conceivable for fresh air to be directly sucked in from the outside via the inlet 2a of the compressor system 2. In this case, the compressed initial gas mixture in the compressor system 2 would be pure fresh air.

The gas separation system 3 only depicted schematically in FIG. 1 serves to provide a nitrogen-enriched gas mixture at the outlet 3b of said gas separation system 3. The gas separation system 3 is thereto designed to separate out at least a portion of the oxygen contained in the initial gas mixture provided by the compressor system 2 in compressed form. The oxygen separated from the initial gas mixture is released to the external atmosphere via an exhaust gas line 3c. Membrane generators or nitrogen generators based on the VPSA or PSA principle are typically used as a gas separation system 3.

The gas separation system 3 is advantageously designed to be selectively operated in VPSA mode or PSA mode.

To be generally understood by a gas separation system operating in VPSA mode is a system for providing nitrogen-enriched air which functions according to the principle of Vacuum Pressure Swing Adsorption (VPSA).

According to one embodiment, a membrane generator or a nitrogen generator operating according to the VPSA or PSA principle is used in the oxygen reduction system 1 as the gas separation system 3. Particularly with respect to saving resources (energy), it is hereby conceivable for a membrane generator or a nitrogen generator to be used which generally operates according to the VPSA principle but which can, however, be operated in a PSA mode when needed; i.e. an operating mode based on the PSA principle.

The "PSA" acronym stands for "pressure swing adsorption," normally denoting pressure swing adsorption technology.

In order to be able to switch the operating mode of the gas separation system 3 used in the example embodiment from VPSA to PSA, it is provided to accordingly increase the degree to which the initial gas mixture is compressed by the compressor system 2.

In conjunction hereto, it is specifically conceivable for an initial gas mixture comprising oxygen, nitrogen and other elements as applicable to first be appropriately compressed in the compressor system 2 and then fed to the gas separation system 3 in which at least a portion of the oxygen contained in the compressed initial gas mixture is separated out such that a nitrogen-enriched gas mixture is provided at the outlet 3b of the gas separation system 3. Said nitrogen-enriched gas mixture furnished at the outlet 3b of the gas separation system 3 can thereafter be introduced into the spatial atmosphere of the first enclosed area 20.1 and/or the second enclosed area 20.2 so as to set and/or maintain an oxygen content in the respective area 20.1, 20.2 which is predefinable and contains less oxygen than normal ambient air.

As FIG. 1 shows, the example embodiment of the inventive oxygen reduction system 1 is provided with a line system 7 via which the outlet 3b of the gas separation system 3 can be fluidly connected to the first and/or second enclosed area 20.1, 20.2. A first valve 5.1 is provided for this purpose at the outlet 3b of the gas separation system 3. This first valve 5.1 connects a first line section 7.1 associated with the first enclosed area 20.1 and a second line section 7.2 associated with the second enclosed area 20.2. This valve 5.1 provided at the outlet 3b of the gas separation system 3 is designed to alternatingly fluidly connect the outlet 3b of the gas separation system 3 to the line section 7.1 associated with the first enclosed area 20.1 and/or the outlet 3b of the gas separation system 3 to the line section 7.2 associated with the second enclosed area 20.2. On the other hand, the valve 5.1 provided at the outlet 3b of the gas separation system 3 can also fluidly disconnect the two line sections 7.1, 7.2 from the outlet 3b of the gas separation system 3.

A further valve 5.4 is arranged in the line section 7.1 associated with the first enclosed area 20.1, preferably in the vicinity of its junction with the first enclosed area 20.1, by means of which the line section 7.1 is fluidly connected to the interior of the enclosed area 20.1 and can thus be called a zone valve. In the same way, a further (zone) valve 5.3 is also provided in the line section 7.2 associated with the second enclosed area 20.2. Further valves 5.2, 5.5 are moreover also provided in the respective line sections 7.1, 7.2. Additional valves and/or branchings, e.g. to other consuming units, not shown in FIG. 1 are likewise conceivable in line sections 7.1, 7.2.

As depicted, the valves 5.1, 5.2, 5.3, 5.4, 5.5 and 5.6 provided in the line system 7 divide the individual line sections 7.1, 7.2, 7.3, 7.4 of the line system 7 into distinct separable areas.

The inventive oxygen reduction system 1 is designed to independently check the line system 7 connecting the outlet 3b of the gas separation system 3 to the areas 20.1, 20.2 assigned to the oxygen reduction system 1 with respect to tightness. It is hereby essential for the standard components of the oxygen reduction system 1 to be employed during the leakage testing.

The compressor system 2 and/or gas separation system 3 is thus accorded a dual function in the inventive solution:

In the normal operating mode of the oxygen reduction system 1, the compressor system 2 serves to compress an initial gas mixture to a predefined or predefinable degree and feed the compressed initial gas mixture to the gas separation system 3. Starting from the compressed initial gas mixture furnished at outlet 3b of the gas separation system 3, an oxygen-reduced gas mixture or inert gas respectively is then provided in the gas separation system 3 which is fed as needed to the first and/or second enclosed area 20.1, 20.2 via the line system 7.

In the test mode, however, the compressor system 2/gas separation system 3 of the oxygen reduction system 1 serves to ready compressed gas for the purpose of the leakage test which is introduced into at least individual line sections 7.1, 7.2, 7.3, 7.4 of the line system 7 so that a leak test can be performed by pressure-testing the line sections 7.1, 7.2, 7.3, 7.4.

If, for example, the tightness of the line section 7.1 allocated to the first enclosed area 20.1 is to be tested, the valve 5.1 provided at the outlet 3b of the gas separation system 3 in the example embodiment depicted in FIG. 1 is then switched such that the line section 7.1 allocated to the first enclosed area 20.1 is fluidly connected to the outlet 3b of the gas separation system 3, while the line section 7.2 allocated to the second enclosed area 20.2 is fluidly disconnected from the outlet 3b of the gas separation system 3. The further valve 5.4 provided in the line section 7.1 associated with the first enclosed area 20.1 is additionally closed so as to block all flow of the gas mixture provided by the gas separation system 3 to the first enclosed area 20.1. Since, however, the valve 5.1 provided at the outlet 3b of the gas separation system 3 fluidly connects the line section 7.1 allocated to the first enclosed area 20.1 to the outlet 3b of the gas separation system 3, the sec-tion 7.1 of the line system 7 to be tested as to tightness remains fluidly connected to the outlet 3b of the gas separation system 3. Excess pressure can thus in particular build up in the line section 7.1 allocated to the first enclosed area 20.1 from the introduction of the gas mixture provided by the gas separation system 3.

After a certain excess pressure has developed in the section 7.1 of the line system 7 to be tested for tightness, the valve 5.1 provided at the outlet 3b of the gas separation system 3 is closed so that the line section 7.1 of the line system 7 to be tested is no longer fluidly connected to the outlet 3b of the gas separation system 3. A pressure measuring system 8.1, particularly an absolute pressure measuring system or a differential pressure measuring system, thereafter determines whether, and if yes, how quickly, the excess pressure previously built up drops off in the line section 7.1 under testing. It is hereby provided for a leak to be inferred in the line section 7.1 under testing upon detection of a drop in pressure which falls below a critical threshold value within a predefined or definable period of time.

In the example embodiment depicted in FIG. 1, the coordination of the controllable components of the oxygen reduction system 1 in test mode, and in particular the coordination of the compressor system 2 and/or the gas separation system 3 as well as the coordination of the respective valves 5.1 to 5.7 associated with the line system 7, is provided by a control device 100. The pressure curve over time determined by means of the pressure measuring system 8.1 to 8.4 in the test mode of the oxygen reduction system 1 is also evaluated in said control device 100.

At least one accordingly assigned threshold value is preferably stored in the control device 100 for each section 7.1 to 7.4 of the line system 7 subjectable to tightness testing. The threshold value can be recorded or determined upon the start-up of the oxygen reduction system 1, but it is of course also conceivable for the threshold to be determined analytically.

The inventive solution is not limited to using the nitrogen-enriched gas mixture provided at the outlet 3b of the gas separation system 3 in the test mode of the oxygen reduction system 1 for pressure-testing the line section 7.1 to 7.4 to be tested. It is in fact advantageous to employ the compressed initial gas mixture provided directly at the outlet 2b of the compressor system 2 for pressure-testing the line section 7.1 to 7.4 in the test mode. The gas separation system 3 can then be switched off or operated in a corresponding standby mode during the test mode, which for example enables maintenance to be performed on the gas separation system 3 while the oxygen reduction system 1 is in the test mode.

Furthermore, directly using the (compressed) initial gas mixture provided at the outlet 2b of the compressor system 2 for the purpose of the leak test in the test mode of the oxygen reduction system 1 can use less resources (energy).

For that reason, the oxygen reduction system 1 depicted schematically in FIG. 1 comprises a bypass line 6 which fluidly connects the outlet 2b of the compressor system 2 directly to the outlet of the gas separation system 3 by way of valves 5.6 and 5.7 in the test mode of the oxygen reduction system 1.

Testing of the other line sections 7.2, 7.3, 7.4, particularly the line section 7.2 associated with the second enclosed area 20.2, is performed analogously to that as described above in conjunction with section 7.1.

In order to enable a leak in a line section 7.1 to 7.4, e.g. in the line section 7.1 allocated to the first enclosed area 20.1, to not only be identified but also localized, it is advantageous for the respective line section 7.1 to 7.4 to be divided into a plurality of directly adjacent areas separable from one another by valves so that the tightness of these areas can be successively tested one after the other.

Leakage testing is preferably performed automatically, and even more preferentially selectively automatically, at predefinable times and/or upon predefinable events, in order to always be able to guarantee compliance with the system's technical standards.

As depicted schematically in FIG. 1, it is advantageous in the oxygen reduction system 1 according to the invention for measuring systems 9.1 and 9.2 to detect the oxygen content prevailing in the spatial atmosphere of the respective at least one enclosed area 20.1, 20.2 associated with the oxygen reduction system 1 continuously or at predefined or predefinable times/events, whereby the oxygen reduction system 1 introduces additional nitrogen-enriched gas into the area 20.1, 20.2 as needed as a function of the detected oxygen content in order to maintain a predefined inertization level within said enclosed area 20.1, 20.2.

FIG. 2 is a schematic view of a further example embodiment of the inventive oxygen reduction system 1 of substantially the same configuration as the oxygen reduction system 1 depicted in FIG. 1. In contrast to the embodiment shown in FIG. 1, however, the oxygen reduction system 1 depicted schematically in FIG. 2 is not realized as a multi-zone system. Instead, the oxygen reduction system 1 shown in FIG. 2 is only associated with one single enclosed area 20.1 and serves to set and maintain a predefined or predefinable drawdown or inerting level in said (single) enclosed area 20.1.

However, the example embodiment of the oxygen reduction system 1 according to FIG. 2 differs from the embodiment described above with reference to the representation provided in FIG. 1 by the provision of a mixing chamber 4 in the oxygen reduction system 1 according to FIG. 2. Specifically, in the embodiment depicted schematically in FIG. 2, the inlet 2a of the compressor system 2 is fluidly connected or connectable to an outlet 4c of a mixing chamber 4. The mixing chamber 4 has two inlets 4a, 4b. A first inlet 4a of the mixing chamber 4 is fluidly connected or connectable to the spatial atmosphere of the (in FIG. 2 single) enclosed area 20.1 by way of a compressor or blower 2.1. Air from the first enclosed area 20.1 and/or the second enclosed area 20.2 can then be supplied to the mixing chamber 4 in regulated manner via inlet 4a and the compressor/blower 2.1.

As shown in FIG. 2, the further inlet 4b of the mixing chamber 4 serves to supply fresh air to the mixing chamber 4 as needed. To this end, a compressor or blower system 2.2. is allocated to the mixing chamber 4 for drawing in fresh air (external air) and supplying it to the mixing chamber 4 through inlet 4b.

The mixing chamber 4 provides the initial gas mixture to be supplied to the compressor system 2. The initial gas mixture can be—as with the embodiment according to FIG. 1—either pure fresh air or also a mixture of fresh air and a portion of the spatial air withdrawn from the first and/or second enclosed area 20.1, 20.2.

In all other respects, the example embodiment of the oxygen reduction system depicted schematically in FIG. 2 corresponds to the system described above with reference to the FIG. 1 depiction. Reference is made to the previously disclosed aspects so as to avoid repetition.

Although it is hereby to be noted that in the embodiment of the inventive oxygen reduction system 1 depicted schematically in FIG. 2, the mixing chamber 4 is not essential to the present invention. As stated above with reference to the embodiment depicted in FIG. 1, it is of course also possible to dispense with the mixing chamber 4 in the single-zone system according to FIG. 2. For example—as disclosed in conjunction with the oxygen reduction system 1 depicted schematically in FIG. 1—fresh air could be drawn in directly from the outside via the inlet 2a of the compressor system 2. In this case, the compressed initial gas mixture in the compressor system 2 would be then pure fresh air.

The invention is not limited to the example embodiments depicted in the drawings but rather yields from an integrated consideration of all the features disclosed herein in context.

It is furthermore to be noted in conjunction hereto that—although not depicted in the drawings—it is of course advantageous for the area(s) 20.1, 20.2 assigned to the oxygen reduction system 1 to be provided with a pressure relief system from the building itself, to preferably automatically achieve a release of pressure in the respective area 20.1, 20.2 during the supplying of the gas/gas mixture provided by the inert gas source (compressor system 2, gas separation system 3). Such a pressure relief system could for example comprise one or more pressure relief valves accordingly dimensioned and configured so as to promptly effect suitable pressure relief in the respective enclosed area 20.1, 20.2 when said area 20.1, 20.2 is flooded with inert gas.

What is claimed is:

1. A method for operating an oxygen reduction system comprising an inert gas source for providing an oxygen-reduced gas mixture, or inert gas respectively, and a line system which is fluidly connected or connectable to the inert gas source and to at least one enclosed area in order to supply at least a portion of the oxygen-reduced gas mixture or the inert gas provided by the inert gas source to the at least one enclosed area as needed, the method comprising:

supplying the at least a portion of the oxygen-reduced gas mixture or the inert gas provided by the inert gas source to the at least one enclosed area through the line system such that an oxygen content in an atmosphere of the enclosed area assumes a predefined or definable value which is reduced compared to the oxygen content of normal ambient air; and conducting a leak test on at least one section of the line system by pressure-testing the at least one section of the line system to be checked for tightness using the at least a portion of the oxygen-reduced gas mixture or the inert gas provided by the inert gas source.

2. The method according to claim 1,
wherein the step of conducting the leak test on the at least one section of the line system, further comprising:
 i) blocking a flow of the oxygen-reduced gas mixture or the inert gas provided by the inert gas source through the line system such that the section of the line system to be tested for the tightness remains fluidly connected to the inert gas source but not to the at least one enclosed area;
 ii) filling the section of the line system under testing with at least a portion of the oxygen-reduced gas mixture or the inert gas provided by the inert gas source such that excess pressure builds up in the section of the line system to be tested for the tightness; and
 iii) determining whether the excess pressure which developed in the section of the line system under testing drops below a critical threshold value within a predefined or definable time period.

3. The method according to claim 2,
wherein a flow through of the line system is blocked in method step i) based on a closing at least one valve in the line system.

4. The method according to claim 3,
wherein method step iii) is initiated after the oxygen-reduced gas mixture or inert gas introduced into the section of the line system to be tested has settled.

5. The method according to claim 3,
wherein a chronological pressure curve is quantified in method step iii) and a decrease in pressure is determined by analyzing the chronological pressure curve.

6. The method according to claim 3, further comprising:
 iv) emitting a malfunction notification when the excess pressure which built up in the section of the line system under testing drops below the critical threshold value within the predefined or definable time period in method step iii).

7. The method according to claim 2,
wherein method step iii) is initiated after the oxygen-reduced gas mixture or the inert gas introduced into the section of the line system to be tested has settled.

8. The method according to claim 7,
wherein a chronological pressure curve is quantified in method step iii) and a decrease in pressure is determined by analyzing the chronological pressure curve.

9. The method according to claim 2,
wherein a chronological pressure curve is quantified in method step iii) and a decrease in pressure is determined by analyzing the chronological pressure curve.

10. The method according to claim 9,
wherein the chronological pressure curve is determined by an absolute pressure or a differential pressure measuring system.

11. The method according to claim 2, further comprising:
 iv) emitting a malfunction notification when the excess pressure which built up in the section of the line system under testing drops below the critical threshold value within the predefined or definable time period in method step iii).

12. The method according to claim 2,
wherein a plurality of directly adjacent sections of the line system separable by valves are successively tested for tightness.

13. The method according to claim 1,
wherein a plurality of directly adjacent sections of the line system separable by valves are successively tested for the tightness.

14. The method according to claim 1,
wherein the inert gas source comprises a compressor system and a gas separation system situated downstream of the compressor system in terms of flow, wherein an initial gas mixture compressed by the compressor system is at least intermittently introduced into an inlet of the gas separation system and wherein the compressed initial gas mixture is at least partly separated into different gas components in the gas separation system such that an oxygen-reduced and nitrogen-enriched gas mixture is provided at an outlet of the gas separation system, wherein to conduct the leak test, either the compressed initial gas mixture provided by the compressor system or the oxygen-reduced and nitrogen-enriched gas mixture provided at the outlet of the gas separation system is introduced into the section of the line system to be checked.

15. The method according to claim 1,
wherein the step of conducting the leak test is performed automatically at predefinable times and/or upon predefinable events, and selected automatically.

16. The method according to claim 1,
wherein the step of conducting the leak test is performed when the oxygen content in the atmosphere of the at least one enclosed area has been reduced to the predefined or definable value by a regulated feed of the at least a portion of the oxygen-reduced gas mixture or the inert gas provided by the inert gas source, and wherein none of the oxygen-reduced gas mixture or the inert gas provided by the inert gas source is fed to the at least one enclosed area through the line system while the leak test is being conducted.

17. The method according to claim 1,
further comprising:
 determining the oxygen content in the atmosphere of the at least one enclosed area,
wherein the oxygen content is determined continuously or at predefined or predefinable times/events.

18. The method according to claim 17,
wherein the step of supplying the at least a portion of the oxygen-reduced gas mixture or the inert gas provided by the inert gas source to the at least one enclosed area occurs as a function of the oxygen content detected in the atmosphere of the at least one enclosed area such that the oxygen content in the atmosphere of the at least one enclosed area can be maintained at the predefined or definable value.

* * * * *